June 24, 1930.        W. H. BENTLEY        1,768,305
WATER CUT-OFF
Filed July 5, 1928
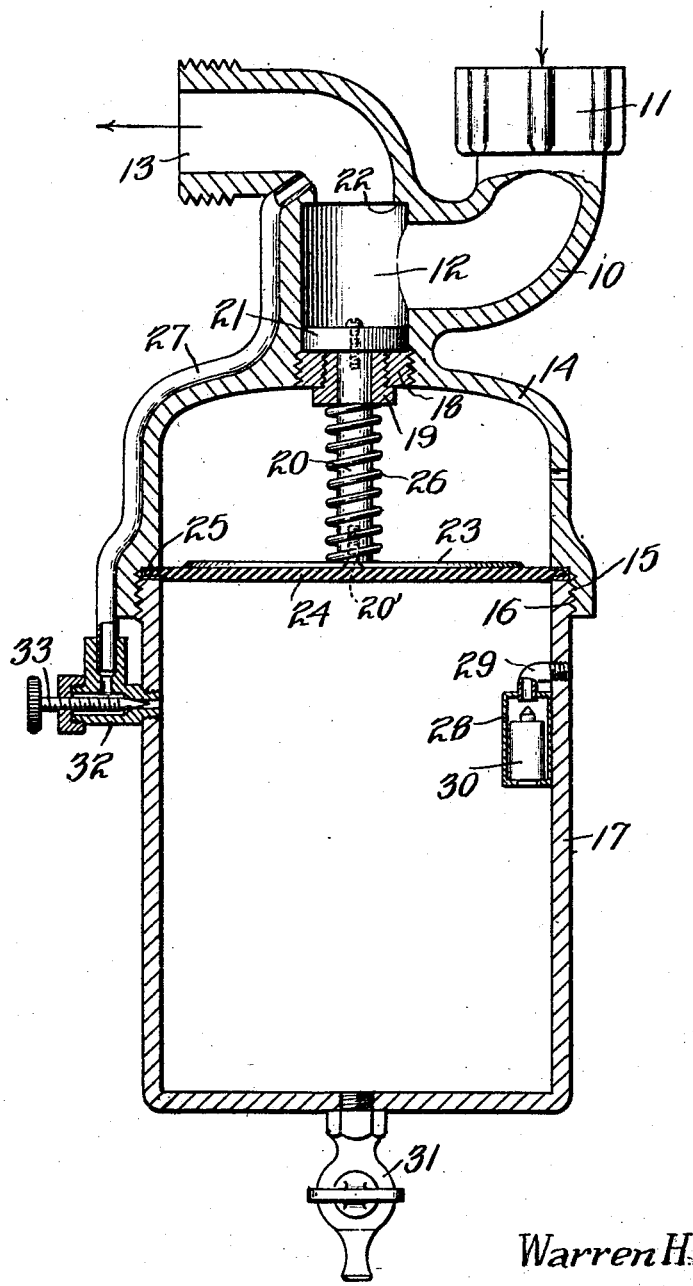
Inventor
Warren H. Bentley
By
Attorney Patented June 24, 1930

1,768,305

UNITED STATES PATENT OFFICE

WARREN H. BENTLEY, OF MIAMI, FLORIDA, ASSIGNOR OF ONE-HALF TO J. GRADY TINGLE, OF MIAMI, FLORIDA

WATER CUT-OFF

Application filed July 5, 1928. Serial No. 290,661.

My invention relates to a device for cutting off the flow of water after a predetermined length of time, or after a predetermined quantity of water has passed through the device; and it is an object of the invention to provide a device of simple and inexpensive construction especially adapted for attachment to lawn sprinklers enabling the sprinkler to be set in operation and by setting the controlling mechanism the device will be caused to run for a predetermined length of time and will shut off when that time has expired, all as will be hereinafter more particularly described and claimed.

Referring to the accompanying drawings which are made a part hereof, and on which similar reference characters indicate similar parts, The figure is a longitudinal vertical section illustrating one application of my invention.

In the drawing reference character 10 indicates a valve casing provided with a connection 11 for attachment to and for receiving water from a faucet (not shown). The valve casing is provided with a cylindrical valve chamber 12 and a discharge passage 13. An enlarged bell-shaped portion or cap 14 is formed on the lower portion of the casing and has its outer extremity provided with internal threads 15 for engagement with external threads 16 on a pressure tank 17. The cap 14 is provided with an opening below the cylinder 12 which forms communication between the cylinder 12 and the interior of the cap, into which opening is threaded a nut 18 having a packing or compression nut 19 threaded into the same, through which extends a valve stem 20 provided with a detachable head 21 on its upper end which is adapted to engage an annular valve seat 22 at its upper end of the cylinder 12 for shutting off the discharge of water or other liquid through the valve body 10. The valve stem 20 has secured to its lower end by means of a screw 20' a disc 23 which forms a bearing plate for a diaphragm 24 of rubber or other elastic material. The diaphragm 24 has a metal rim 25 to render the same capable of being easily removed and replaced, and such rim is secured between the upper extremity of the tank 17 and the adjacent shoulder of the cap 14 and forms an air-tight joint. A spring 26 is confined between the nut 19 and the bearing plate 23 and serves to maintain the valve in its lowermost position with the bearing plate 23 in contact with the diaphragm 24.

From the above it will be readily understood that in moving the diaphragm 24 and bearing plate 23 upwardly the valve stem will be caused to lift the valve 21 and sufficient upward movement will cause the engagement of the valve with its seat thus shutting off the supply of water passing through the valve body.

In order to cause the expansion of the diaphragm I provide a tube 27 which forms communication between the passage 13 and the interior of the tank 17 and by means of which water will be caused to enter said tank. Within the tank 17 is provided a valve casing 28 which has communication by means of a nipple 29 with the atmosphere and in said casing 28 is disposed a float valve 30 which will permit the expelling of the air when water flows through the pipe 27 into the tank until such time as the water reaches the level of the float valve 30, whereupon the float valve will seat against the extremity of the nipple 29 and prevent the further discharge of air therethrough. The continued flow of water into the tank will build up a pressure sufficient to distort the diaphragm 24 against the action of the spring 26 and move the valve 21 toward its seat 22. This movement will be aided by the force of the water against the under side of the valve 21 and force the valve against its seat and hold it there shutting off the supply of water.

A drain cock 31 is disposed in the bottom of the tank 17 for draining the contents of the tank after which the drain cock is closed to permit the repetition of the above described operation.

In order to vary the length of time, or the amount of water, required to flow through the valve casing 10, I provide a valve casing 100

32 in the line 27 between the passage 13 and the tank 17 and a needle valve for controlling the flow through said valve casing. Such needle valve may be provided with any desired means for indicating its relative position so that it may be set in proper manner to operate for the desired length of time.

My device is simple in construction, is devoid of complicated mechanism and all wearing parts being capable of being easily replaced by an inexperienced person in a very short time. Further, its cost is such that it is not prohibitive and the device will soon pay for itself in the amount of water saved since it is not dependent for its operation upon any human agency.

It will be obvious to those skilled in the art that various changes may be made in my device without departing from the spirit of the invention, and I, therefore, do not limit myself to what is shown in the drawings and described in the specification, but only as set forth in the appended claims.

Having thus fully described my said invention, what I claim as new and desire to secure by Letters Patent, is:

1. A valve casing having a normally unobstructed passageway therethrough, a valve for closing the flow through the valve casing, a flexible diaphragm for operating the valve, a chamber at one side of the diaphragm, means for causing a gradual filling of the chamber and distortion of the diaphragm for closing the valve, said means comprising a passage forming communication between the valve body and said chamber, a passage from said chamber to the atmosphere and a float valve for closing said passage, substantially as set forth.

2. A valve casing having inlet and discharge ports, a valve for closing the flow through the valve casing, a flexible diaphragm for operating the valve, a chamber at one side of the diaphragm, and means for causing a gradual filling of the chamber and distortion of the diaphragm for closing the valve, said means comprising a relatively small tube providing communication between the discharge side of the valve casing and said chamber, a passage from said chamber to the atmosphere and a float valve for closing said passage, substantially as set forth.

3. A valve casing having inlet and discharge ports, a valve for closing the flow through the valve casing, a flexible diaphragm for operating the valve, a chamber at one side of the diaphragm, means for causing a gradual filling of the chamber and distortion of the diaphragm for closing the valve, said means comprising a relatively small tube providing communication between the discharge side of the valve casing and said chamber, a passage from said chamber to the atmosphere and a float valve for closing said passage, and means for controlling the flow through said small tube, substantially as set forth.

In witness whereof, I have hereunto set my hand and seal at Miami, Florida, this 28th day of June, A. D. nineteen hundred and twenty-eight.

WARREN H. BENTLEY.